E. B. WEAKLY,
Corn Planter.
No. 27,661.  Patented Mar. 27, 1860.
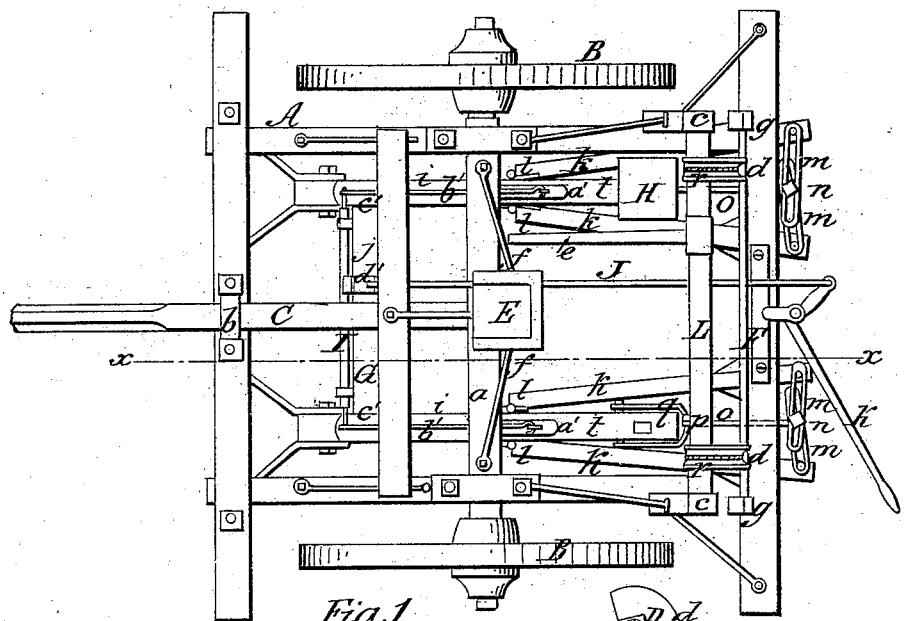
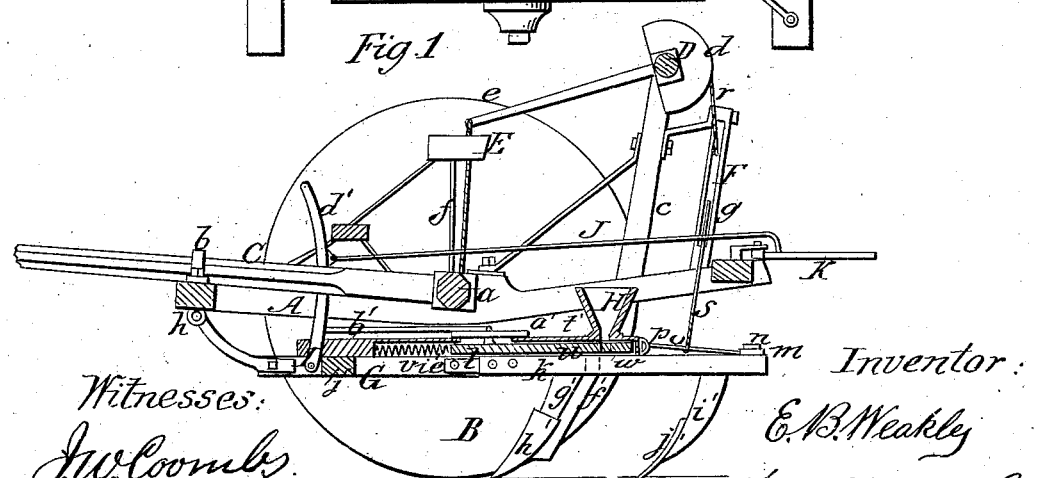
Witnesses:
J. W. Coombs.
R. S. Spencer.
Inventor:
E. B. Weakly
per Munn & Co.
Attys.

UNITED STATES PATENT OFFICE.

EDWARD B. WEAKLY, OF PANA, ILLINOIS.

IMPROVEMENT IN SEEDING-MACHINES.

Specification forming part of Letters Patent No. 27,661, dated March 27, 1860.

*To all whom it may concern:*

Be it known that I, EDWARD B. WEAKLY, of Pana, in the county of Christian and State of Illinois, have invented a new and Improved Combination of a Seeding-Machine and Cultivator; and I do hereby declare that the following is a full, clear, and exact description of the same, reference being had to the annexed drawings, making a part of this specification, in which—

Figure 1 is a side sectional view of my invention, taken in the line *x x*, Fig. 2; Fig. 2, a plan or top view of the same.

Similar letters of reference indicate corresponding parts in the two figures.

This invention consists in the employment or use of seed-distributing devices and share-frames attached to a mounted frame, and arranged as hereinafter fully shown and described, whereby seed may be planted in hills or drills, and the ground also pulverized and freed from weeds, the machine being used for either purpose separately, as may be required.

To enable those skilled in the art to fully understand and construct my invention, I will proceed to describe it.

A represents a rectangular frame, which is mounted on two wheels, B B, the axle *a* of which is secured to the center of frame A.

C is the draft-pole, the inner end of which is attached to the axle *a*, the pole passing through a clip, *b*, on the front part of the frame A. To the back part of the frame A two uprights, *c c*, are attached—one at each side. The upper ends of these uprights form bearings for a shaft, D, which has two semi-pulleys, *d d*, attached to it, and an arm, *e*, the latter extending forward to a point by the side of the driver's seat E, which is placed on rods or supports *f*.

To the frame A, and just behind the uprights *c c*, uprights *g g* are attached. These uprights *g g* are grooved vertically at their inner sides, and the ends of a bar, F, are fitted in these grooves and allowed to slide freely up and down thereon.

To the under side of the frame A, and to its front part, a frame, G, is attached by joints or hinges *h*. This frame G is formed of two longitudinal and parallel bars, *i i*, connected by a cross-bar, *j*.

To each longitudinal bar *i* two bars, *k k*, are attached—one at each side—by joints *l l*, and the back ends of each pair of bars *k k* are connected by links *m m*, which overlap each other and have a bolt, *n*, passing through them. The bolts *n n* also pass through the outer ends of rods *o*, the front ends of which are connected by joints *p* to links *q*, which are attached to the back ends of the bars *i*, as shown clearly in Fig. 2.

To the semi-pulleys *d d* of the shaft D cords or chains *r r* are attached—one to each. The cords or chains are connected to the bar F, and the latter is connected by cords or chains *s s* to the rods *o o*.

On the back part of each bar *i* a seed-box, H, is placed. These seed-boxes are secured to bars *t t*, which are grooved at their under sides to receive a slide, *u*, and a spring, *v*, as shown clearly in Fig. 1. The slides *u* are each provided with a seed-cell, *w*, and the springs *v* have a tendency to keep said cells underneath the seed-boxes. The bars *t t* are slotted longitudinally in their upper surfaces to allow pins to pass through and connect small blocks *a'* to the slides *u*. The front end of each block *a'* is connected by a rod, *b'*, to a crank-shaped projection, *c'*, at each end of a shaft, I, which is attached to the front end of the frame G. The shaft I has an upright arm or lever, *d'*, secured to it, and this arm and lever is connected by a rod, J, with a lever, K, at the back end of the frame A.

The joints *l*, which connect the bars *k k* to the bars *i i*, are not rigidly attached to the bars *i*, but are secured thereto by pivots *e'*, so as to admit of a vertical movement of the bars *k* independently of the bars *i*. To the under side of each bar *i* an inclined tube, *f'*, is attached. These tubes communicate with holes which pass entirely through the bars *i*, and over which the slides *u* work. To the under side of each bar *i* a foot, *g'*, is attached, each foot having a furrow-share, *h'*, secured to it, and to the back part of each bar *k* a foot, *i'*, is attached, each foot *i'* having a share, *j'*, secured to it.

The operation is as follows: As the machine is drawn along, the driver, from the seat E, can at any time cause seed to be dropped from the boxes H by shoving outward with his foot the arm or lever *d'*. By this movement of said arm or lever the holes *w* of the slides *u* are brought in line with the tubes *f'*. The backward movement of the slides *u* is given by the springs *v*.

When the driver releases the arm or lever $d'$, the shares $h'$ form the furrows, while the shares $j'$ cover the seed. The seed may also be dropped by an attendant behind the machine, the lever K being operated. The driver, by depressing the arm or lever $e$, may elevate the bars $k\ k$ at any time, and also may elevate the bars $i$ by depressing the arm or lever $e$ a sufficient distance. When the machine is used as a cultivator only, the seed-distributing device, of course, is not operated, and the shares $j'$ are adjusted nearer together or farther apart, as occasion may require, by lowering the bolts $n$, spreading the bars $k$ to the required distance, and then tightening the bolts $n$, and as the bars $k\ k$ may be raised a certain distance independently of the bars $i$, and the latter then raised with the bars $k$, the shares are placed under the complete control of the operator, and the machine adapted to the cultivation of various growing crops.

I do not claim separately and irrespective of arrangement any of the within-described parts; but I do claim as new and desire to secure by Letters Patent—

The swinging frame G, provided with the seed-distributing devices, expanding and vertically-moving bars $k\ k$, and shares $h'\ j'$, and attached to the mounted frame A by joints or hinges $h$ at its front end, and by the chains or cords $r\ s$ and bar F at its back end, all being arranged as and for the purposes specified.

EDWARD B. WEAKLY.

Witnesses:
A. G. NEEL,
M. C. NEEL.